United States Patent [19]

Shepherd

[11] Patent Number: 4,929,256
[45] Date of Patent: May 29, 1990

[54] MULTI-DISC CUTTER AND METHOD OF MANUFACTURE

[75] Inventor: Mark R. Shepherd, Royston, England

[73] Assignee: AM International, Inc., Chicago, Ill.

[21] Appl. No.: 246,225

[22] Filed: Sep. 19, 1988

[30] Foreign Application Priority Data

Sep. 19, 1987 [GB] United Kingdom ............ 8722085

[51] Int. Cl.$^5$ .................................... B24D 3/00
[52] U.S. Cl. ............................... 51/293; 51/295; 51/298
[58] Field of Search ................. 51/293, 295, 298

[56] References Cited

U.S. PATENT DOCUMENTS

| | | | |
|---|---|---|---|
| 3,663,191 | 5/1972 | Kroder | 51/293 |
| 4,282,012 | 8/1981 | Lobachev et al. | 51/293 |
| 4,481,016 | 11/1984 | Campbell et al. | 51/295 |

*Primary Examiner*—Paul Lieberman
*Assistant Examiner*—Willie J. Thompson
*Attorney, Agent, or Firm*—Nicholas A. Camasto; Jack Kail

[57] ABSTRACT

An abrasive multi-disc cutter is formed by uniformly coating a cylindrical holder with a mixture of diamond powder and resin. The holder is rotated about its longitudinal axis while one or more beams of laser energy are used to ablate the resin for forming a plurality of annular depressions in the coating, the depressions being equally spaced along the longitudinal axis of the cylindrical holder. An abrasive annular cutting disc is thereby provided between each pair of successive annular depressions. The cutter is used to cut a plurality of parallel, spaced ink cavities in a piezoelectric substrate forming part of an ink jet printer printhead.

21 Claims, 2 Drawing Sheets

MULTI-DISC CUTTER AND METHOD OF MANUFACTURE

BACKGROUND OF THE INVENTION

The present invention relates generally to novel abrasive cutting tools and their method of manufacture and particularly concerns a novel multi-disc cutter, its method of manufacture and its use in the manufacture of ink jet printheads.

Copending application Ser. Nos. 140,617 and 140,764, both filed Jan. 4, 1988 and both entitled DROPLET DEPOSITION APPARATUS, disclose ink jet printheads having a plurality of linear, parallel ink cavities or channels formed in a pre-poled piezoelectric ceramic. In order to provide a printhead having the desired operating characteristics and print resolution, the dimensions of the ink cavities are quite small and their tolerances must be precisely controlled. A typical printhead may, for example, have ink cavities which are about 30–200 microns wide by 150–1000 microns deep and a cavity pitch of about 75–500 microns. Due to the linear cutting speeds achievable, the possibility of channel depth profiling and the manufacturing tolerances required, the use of diamond cutting tools is presently preferred to form the ink cavities. While a number of such tools are currently available, their is a need for a more efficient tool, particularly for use in a mass production environment.

A known prior art technique of forming tools of various configurations is that of laser ablation. For example, U.S. Pat. Ser. No. 4,533,812 teaches the use of a laser to shape a diamond grinding disc and U.S. Pat. Ser. No. 4,170,726 teaches the use of a laser to form a workpiece by melting selected areas of the workpiece and then removing the resulting melt. None of the known prior art techniques, however, are considered satisfactory for the purpose of forming diamond cutting tools suitable for use in the mass production of ink jet printheads, especially printheads having ink cavities with the precisely controlled and extremely fine dimensions described above.

OBJECTS OF THE INVENTION

It is therefore a basic object of the present invention to provide an improved abrasive cutting tool and a method for its manufacture.

It is a more specific object of the invention to provide an improved abrasive cutting tool especially adapted for use in the mass production of ink jet printheads.

It is yet a further object of the invention to provide a highly precise abrasive cutting tool adapted for efficiently forming a plurality of linear, parallel ink cavities having extremely small and precisely controlled dimensions in a piezoelectric ceramic ink jet printhead.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENTS

Figure 1:
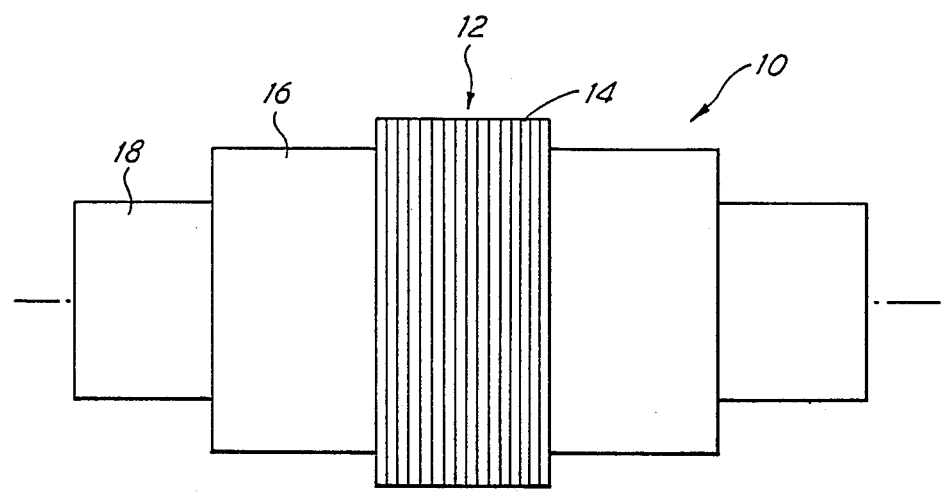
FIG. 1 is a side elevation view of a multi-disc cutter formed according to the methods of the present invention.

A multi-disc cutter 10 manufactured according to the present invention is illustrated in FIG. 1. The cutter 10 includes an annular cutting head 12 comprising a plurality of spaced abrasive cutting discs or ridges 14, which may be equally or unequally spaced as desired. As will be explained in further detail hereinafter, discs 14 comprise a mixture of diamond powder and resin. Annular cutting head 14 is coaxially mounted for rotation on a steel cylinder 16 which, in turn, is coaxially mounted for rotation on a shaft 18.

Multi-disc cutter 10 is particularly useful in connection with the manufacture of ink jet printheads of the type described in the above-mentioned copending applications. These printheads comprise a pre-poled piezoelectric ceramic having a plurality of linear, parallel ink cavities or channels formed therein. The cavity dimensions, whose tolerances must be very precisely controlled, are typically on the order of 30–200 microns wide by 150–1000 microns deep with a cavity separation pitch of about 75–500 microns. The abrasive discs 14 of cutting head 12 are correspondingly dimensioned and, in particular, preferably have a height H somewhat exceeding the cavity depth, a width W corresponding to the width of the cavities of the printhead and a pitch P equal to or comprising a multiple of the cavity pitch. Discs 14 may also be formed with an unequal pitch when required to produce ink channels characterized by an unequal pitch. The number of discs 14 on the cutting head 12 is preferably binary to facilitate the cutting of ink cavities in the piezoelectric ceramic to match the electronic drive chips which are normally provided with drive connections that are also binary.

Figure 2:
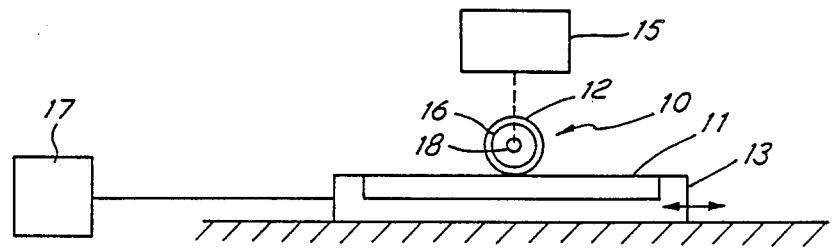
FIG. 2 illustrates a method of using the cutter of FIG. 1 to form a plurality of ink cavities in the piezoelectric substrate of an ink jet printhead.

As shown in FIG. 2, cutter 10 is used to cut the ink cavities in a sheet of piezoelectric ceramic 11 by mounting the ceramic substrate in a suitable machining jig 13, rotating the cutter by means of shaft 18 at a high speed in the manner of a dicing blade and translating the cutter longitudinally along the length of the ceramic. Rotation and translation of the cutter may be effected by a control system 15. A plurality of linear, parallel cavities are thereby formed in the ceramic. A suitable cutting fluid may, of course, be used to facilitate the cutting process. Alternatively, the piezoelectric ceramic may be longitudinally translated relative to the rotating cutter by a control system 17 to form the cavities. In either case, the longitudinal translation is preferably performed in a step-wise manner and, depending on the pitch P of discs 14, multiple passes (two to four for example) may be required to cut the cavities to the selected design pitch. Also, the cutter discs 14 may be optically inspected from time to time during cutting to maintain precise location of the cutter relative to the piezoelectric ceramic and to identify wear or breakage of cutter discs.

Figure 3:
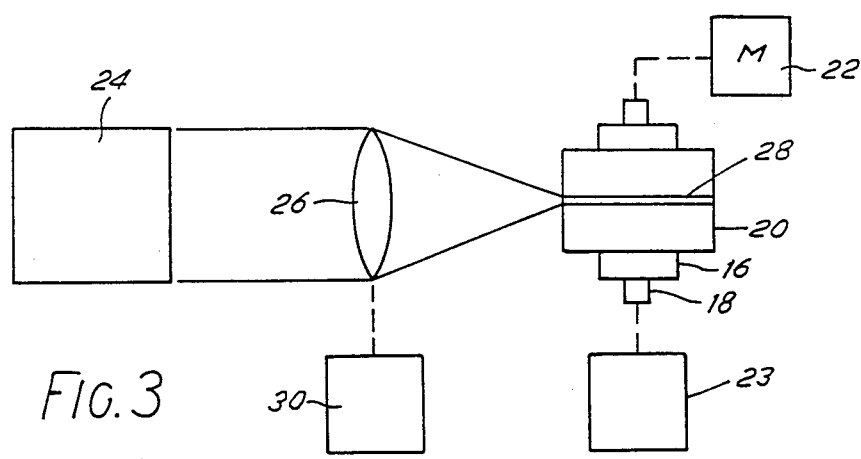
FIG. 3 illustrates one method of forming the multi-disc cutter of FIG. 1 according to the present invention.

One method of forming the cutter 10 of the invention is illustrated in FIG. 3. A portion of cylinder 16 is initially uniformly coated with a mixture 20 of diamond powder and resin to a depth exceeding the desired height H of discs 14. Mixture 20 may comprise an epoxy resin filled with diamond particles having a size of about 0.1-2.0 microns. This composition provides for good bonding of mixture 20 to steel cylinder 16 and also exhibits excellent abrasive characteristics due to the presence of the diamond powder. At the same time, the mixture has a relatively low ablation threshold due to the resin binder. That is, the energy required to ablate the resin is substantially lower than that required for ablation of the diamond powder. Shaft 18, mounted in suitable bearings, is coupled to a motor 22 for rotating cylinder 16 and mixture 20 bonded thereto while the coating is exposed to pulsed laser energy of an ultraviolet wavelength. The laser energy is supplied by a laser source 24, preferably a pulsed excimer laser, and focused on to the coating 20 by a lens system 26 at an intensity (e.g. 0.1-0.2 $Jcm^2$ per pulse) suitable for ablating the resin to form an annular depression 28 of selected depth and width circumscribing steel cylinder 16. The diamond powder, while not being ablated because of its higher ablation threshold (about 10-20 $Jcm^2$ per pulse) will, of course, also be removed since it is held in mixture by the resin. The annular depression 28 so formed may extend to the surface of cylinder 16 but, preferably the ablation process is terminated prior to reaching the cylinder surface.

Conventional pulsed laser sources can conveniently ablate about one micron of the diamond powder-resin mixture per pulse thereby requiring multiple pulse cycles to achieve the desired depth of depression 28. The assembly comprising cylinder 16, shaft 18 and mixture 20 is preferably displaced in steps along its longitudinal axis by a positioner 23 so that a plurality of depressions 28 are formed in coating 20. Alternately, lens 26 may be associated with a suitable control mechanism 30 to progressively displace the focused laser beam in equal steps along the longitudinal axis of cylinder 16. During each step an annular depression 28 is formed by ablation of the coating so that upon completion of the process, a plurality of such depressions are provided, the depressions being equally spaced along the longitudinal axis of cylinder 16.

Figure 4:
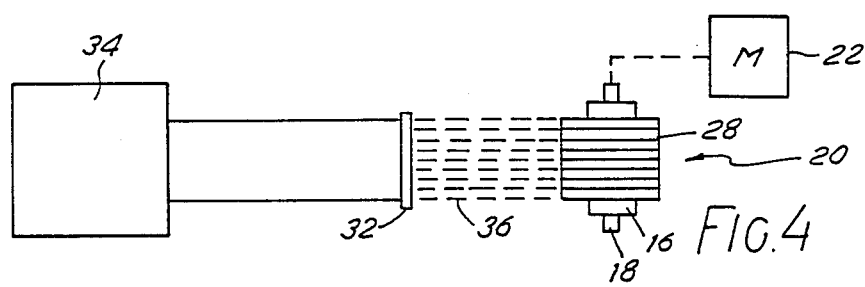
FIG. 4 illustrates a second method of forming the multi-disc cutter of FIG. 1 according to the present invention.

FIG. 4 illustrates another method of forming the cutter 10 illustrated in FIG. 1. This method is generally similar to the method shown in FIG. 2 except that a number of depressions 28 are formed simultaneously. In this case, a suitable mask 32 having a plurality of collimating apertures is flooded with laser energy from a source 34. A plurality of collimated laser beams 36 are thereby simultaneously applied to the rotating coating 20. Each beam 36 forms a respective annular depression 28 by ablating the resin from the diamond powder-resin mixture to simultaneously create a plurality of equally spaced annular, abrasive cutting discs 14. The mask 32 may be configured to form all of the depressions 28 at one time or may be stepped to form the depressions in successive groups.

Using either of the techniques illustrated in FIGS. 3 or 4, it will be understood that an abrasive cutting disc 14 comprising the unablated diamond powder-resin mixture is formed intermediate each successive pair of depressions 28. The height H, width W and pitch P of cutting discs 14 may be precisely controlled by appropriately applying selectively focused and stepped laser energy in the formation of depressions 28. Laser systems for achieving a high degree of accuracy in forming depressions 28 are well known in the art.

Figure 5A:
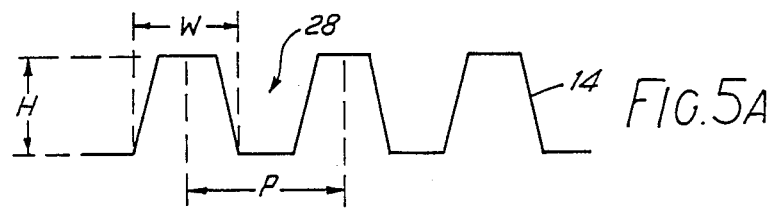
FIGS. 5A and 5B are enlarged views illustrating the cutting disc profiles of two multi-disc cutters manufactured according to the present invention.

In one embodiment of the invention illustrated in FIG. 5A, the discs 14 exhibit a tapered profile, being narrower at the tip and wider at the base of the cutting head. The amount of taper shown in the drawing is somewhat exaggerated for purposes of illustration, normally being on the order of about 10 degrees. As explained in the aforementioned copending applications, the formation of ink cavities with a corresponding taper is considered advantageous in some situations. The taper characterizing discs 14 is, of course, the result of the reverse taper exhibited by depressions 28. This reverse taper is an inherent characteristic of the ablation process used in forming cutting head 12. In particular, the steepness of the walls defining depressions 28 is a function of the energy used in the ablation process, the application of more intense energy resulting in steeper more vertical walls and the application of less energy resulting in walls having a more gradual slope. Thus, by appropriately selecting the applied ablating energy, cutting discs 14 of a desired taper can be conveniently provided.

Figure 5B:
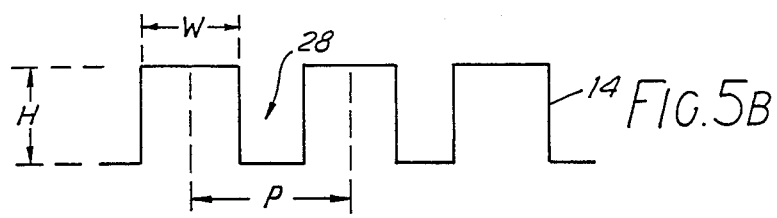

While, as indicated above, it is sometimes advantageous to provide ink channels with tapered walls, the channels are normally required to be rectangular. In order to cut such rectangular ink channels, the cutting discs 14 must also have a rectangular profile as illustrated in FIG. 5B. This can be effected by introducing a relative rocking motion between the cutter and laser beam during the ablation process. This relative rocking motion tends to undercut the depressions 28 to eliminate the taper that would otherwise be established. For example, referring to FIG. 3, the cutter assembly can be rocked about its longitudinal axis by positioner 23 while maintaining the laser optics stationary to eliminate the taper or, alternatively, means capable of rocking the optical beam may be provided.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A method of making an abrasive cutting tool having precisely controlled dimensions, comprising the steps of:
   uniformly coating at least a portion of a cylindrical holder with a mixture of diamond powder and resin;
   rotating said cylindrical holder about its longitudinal axis; and
   exposing the rotating coating to an optical beam having an energy level less than the ablation threshold of said diamond powder and adapted for ablating the resin in said mixture so as to form a plurality of spaced annular depressions in said coating, each pair of successive depressions defining therebetween an abrasive cutting disc.

2. The method of claim 1 wherein said exposing step comprises exposing said coating to a high energy beam for forming each of said annular depressions with a predetermined tapered profile such that each of said cutting discs is characterized by a tapered profile reverse that of said predetermined profile.

3. The method of claim 2 including the step of effecting relative rocking motion between said cylindrical holder and said optical beam so as to form each of said annular depressions with a substantially rectangular profile, whereby each of said cutting discs is also characterized by a substantially rectangular profile.

4. The method of claim 2 wherein said coating step comprises coating at least a portion of said cylindrical holder with said mixture to a depth exceeding the depth of said annular depressions formed therein.

5. The method of claim 4 wherein said exposing step comprises displacing said optical beam and said cylindrical holder relative to each other in a plurality of steps along the longitudinal axis of said holder to form said plurality of annular depressions.

6. The method of claim 4 wherein said exposing step comprises simultaneously ablating said resin with a plurality of high energy laser beams spaced along the longitudinal axis of said cylindrical holder to form said plurality of annular depressions.

7. The method of claim 5 including employing an excimer laser as said optical beam.

8. A method of making an abrasive cutting tool having precisely controlled dimensions, comprising the steps of:

uniformly coating at least a portion of a cylindrical holder with a mixture of diamond powder and resin;

rotating said cylindrical holder about its longitudinal axis;

exposing the rotating coating to an optical beam having an energy level less than the ablation threshold of said diamond powder and adapted for ablating the resin in said mixture so as to form a plurality of spaced annular depressions in said coating, each pair of successive depressions defining therebetween an abrasive cutting disc; and effecting relative rocking motion between said cylindrical holder and said optical beam so as to form each of said annular depressions with a substantially rectangular profile, whereby each of said cutting discs is also characterized by a substantially rectangular profile.

9. The method of claim 8 wherein said coating step comprises coating at least a portion of said cylindrical holder with said mixture to a depth exceeding the depth of said annular depressions formed therein.

10. The method of claim 9 wherein said exposing step comprises displacing said optical beam and said cylindrical holder relative to each other in a plurality of steps along the longitudinal axis of said holder to form said plurality of annular depressions.

11. The method of claim 9 wherein said exposing step comprises simultaneously ablating said resin with a plurality of high energy laser beams spaced along the longitudinal axis of said cylindrical holder to form said plurality of annular depressions.

12. The method of claim 10 including employing an excimer laser as said optical beam.

13. A method of making an abrasive cutting tool having precisely controlled dimensions, comprising the steps of:

uniformly coating at least a portion of a cylindrical holder with a mixture of diamond powder and resin;

rotating said cylindrical holder about its longitudinal axis; and exposing the rotating coating to a plurality of high energy optical beams spaced along the longitudinal axis of said cylindrical holder, each of said beams having an energy level less than the ablation threshold of said diamond powder, said beams being adapted for ablating the resin in said mixture so as to form a plurality of spaced annular depressions in said coating, each pair of successive depressions defining therebetween an abrasive cutting disc.

14. The method of claim 13 including the step of effecting relative rocking motion between said cylindrical holder and said optical beam so as to form each of said annular depressions with a substantially rectangular profile, whereby each of said cutting discs is also characterized by a substantially rectangular profile.

15. The method of claim 13 wherein said coating step comprises coating at least a portion of said cylindrical holder with said mixture to a depth exceeding the depth of said annular depressions formed therein.

16. The method of claim 16 including employing an excimer laser as the source of said optical beams.

17. An abrasive cutting tool comprising a generally cylindrically shaped cutting head coated with a mixture of diamond powder and resin, said cutting head having a plurality of annular depressions spaced along its longitudinal axis, each pair of successive depressions defining therebetween a respective annular abrasive cutting disc, said depressions being formed by rotating said cutting head about its longitudinal axis while exposing the rotating head to an optical beam having an energy level less than the ablation threshold of said diamond powder and adapted for ablating the resin in said mixture so as to form said annular depressions.

18. The cutting tool of claim 17 wherein said mixture has a substantially uniform thickness which exceeds the depth of the annular depressions formed therein.

19. The cutting tool of claim 17 wherein said depressions are further formed by effecting relative rocking motion between said cylindrical cutting head and said optical beam so as to form each of said annular depressions with a substantially rectangular profile, whereby each of said cutting discs is also characterized by a substantially rectangular profile.

20. The cutting tool of claim 18 wherein said depressions are further formed by displacing said optical beam and said cylindrical cutting head relative to each other in a plurality of steps along the longitudinal axis of said cutting head to form said plurality of annular depressions.

21. The cutting tool of claim 18 wherein said depressions are further formed by simultaneously ablating said resin with a plurality of high energy laser beams spaced along the longitudinal axis of said cylindrical cutting head to form said plurality of annular depressions.

* * * * *